United States Patent

Oh

[19]

[11] Patent Number: 5,986,855
[45] Date of Patent: Nov. 16, 1999

[54] HEAD DRUM ASSEMBLY HAVING AN OILLESS BEARING DESIGNED TO FACILITATE ITS INSTALLATION WITHIN THE SAME

[75] Inventor: Se-Woog Oh, Seoul, Rep. of Korea

[73] Assignee: Daewoo Electronics Co., Ltd., Rep. of Korea

[21] Appl. No.: 09/102,572

[22] Filed: Jun. 23, 1998

[30] Foreign Application Priority Data

Jul. 29, 1997 [KR] Rep. of Korea ........................ 97-35724

[51] Int. Cl.$^6$ ........................................................ G11B 5/52
[52] U.S. Cl. ................................................................ 360/107
[58] Field of Search .................................................. 360/107

[56] References Cited

U.S. PATENT DOCUMENTS 5,581,425  12/1996  Choi .
5,675,457  10/1997  Kim ........................................ 360/107
5,709,480   1/1998  Hong .

FOREIGN PATENT DOCUMENTS 0566355  12/1944  United Kingdom .
2318205   4/1998  United Kingdom .

*Primary Examiner*—A. J. Heinz
*Attorney, Agent, or Firm*—Pennie & Edmonds LLP

[57] ABSTRACT

A head drum assembly is provided with a pair of oilless bearings installed within a bore of a stationary drum. Each of the oilless bearings is of a general donut-shaped configuration. A cross section thereof is provided with an external circular shape portion, an upper and a lower bearing surfaces. The upper and the lower bearing surfaces define an inner bore of the oilless bearing into which a rotating shaft are received, and slantly extend from the pair of planar portions, respectively, meeting at an apex in equal angles.

3 Claims, 5 Drawing Sheets

HEAD DRUM ASSEMBLY HAVING AN OILLESS BEARING DESIGNED TO FACILITATE ITS INSTALLATION WITHIN THE SAME

FIELD OF THE INVENTION

The present invention relates to a head drum assembly for use in a tape recorder; and, more particularly, to a head drum assembly with an oilless bearing designed to facilitate a precise installation thereof within a bore of the head drum assembly.

BACKGROUND OF THE INVENTION

A tape recorder, such as a video cassette recorder or a video camera, includes a head drum assembly containing a video head which is used to either record or play back the video portion on or off a magnetic tape, a rotary drum, a stationary drum and a pair of transformers.

In FIG. 1, there is shown one of the prior art head drum assemblies, which consists of a rotary drum 10 and a stationary drum 11 which are mounted around an upper and a lower portions of a supporting shaft 12, respectively. As shown, the rotary drum 10 is closely fitted around the supporting shaft 12 rotatably supported by the stationary drum 11 via a pair of ball bearings 13a and 13b installed on a bore 11b of a boss 11a. For the installation of the ball bearings 13a and 13b, a pair of bearing seats 11c and lid are formed on an upper and a lower portions of the bore 11b, respectively, which must be accurately sized after a machining process.

Further, a rotor and a stator transformers 14 and 15 are mounted on the head drum assembly, with a predetermined separation therebetween in order to transmit signals between the rotary and the stationary drums 10 and 11. At least two video heads 16 are attached on the rotary drum 10; and a driving motor 17 including a rotor 18 and a stator 19 is positioned under the stationary drum 11.

The head drum assembly constructed in this manner, however, is not easy to assemble, due mainly to the way the ball bearings are installed within the bore of the stationary drum. That is, it is somewhat difficult to precisely align the axis of such bearings with each other or with other parts of the assembly by using a conventional method in which a mandrel or a sizing bar is employed, when the bearings are installed within the head drum assembly.

SUMMARY OF THE INVENTION

It is, therefore, a primary object of the invention to provide a head drum assembly having an oilless bearing designed to facilitate a precise installation thereof within a bore of the head drum assembly.

The above and other objects of the invention are accomplished by providing a head drum assembly provided with a pair of oilless bearings installed within a bore of a stationary drum. Each of the oilless bearings is of a general donut-shaped configuration. A cross section thereof is provided with an external circular shape portion, an upper and a lower bearing surfaces. The upper and the lower bearing surfaces define an inner bore of the oilless bearing into which a rotating shaft are received, and slantly extend from the pair of planar portions, respectively, meeting at an apex in equal angles.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENTS

A preferred embodiment of the inventive head drum assembly will now be described with reference to FIGS. 2 through 4c.

Figure 1:
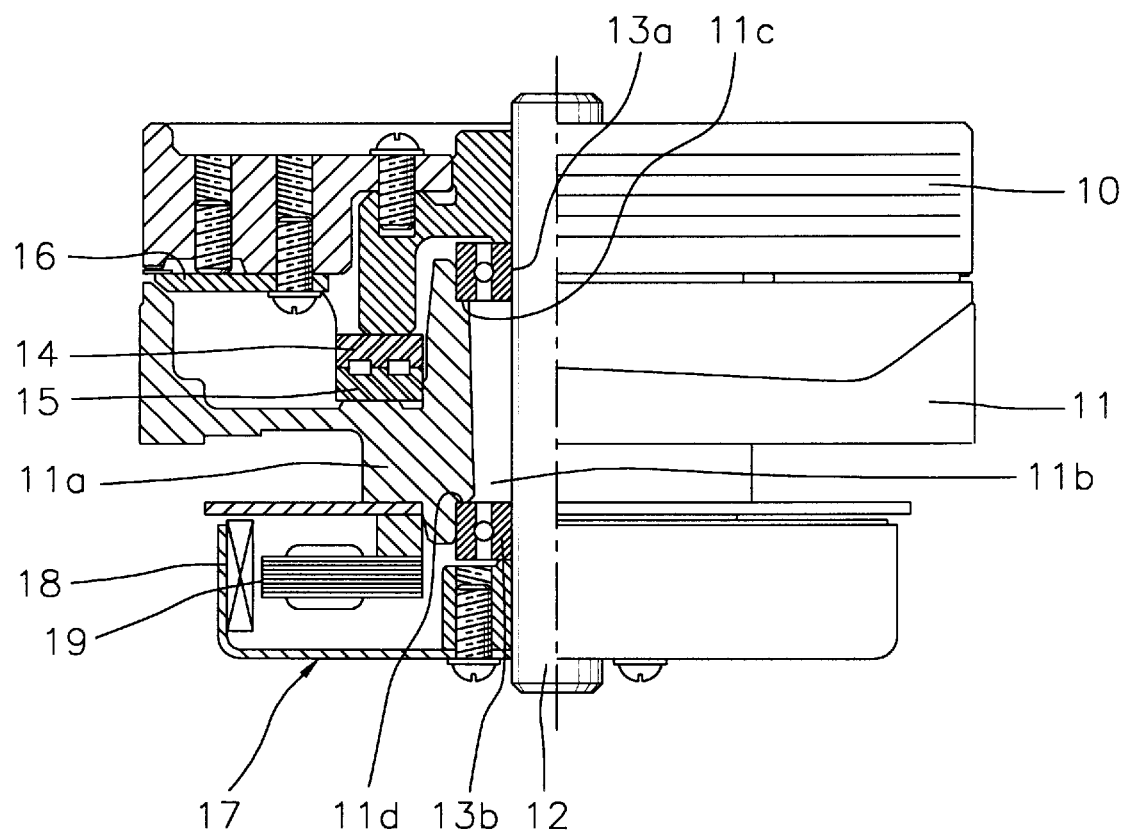
FIG. 1 shows a sectional view of a prior art head drum assembly employing a pair of ball bearings.
Figure 2:
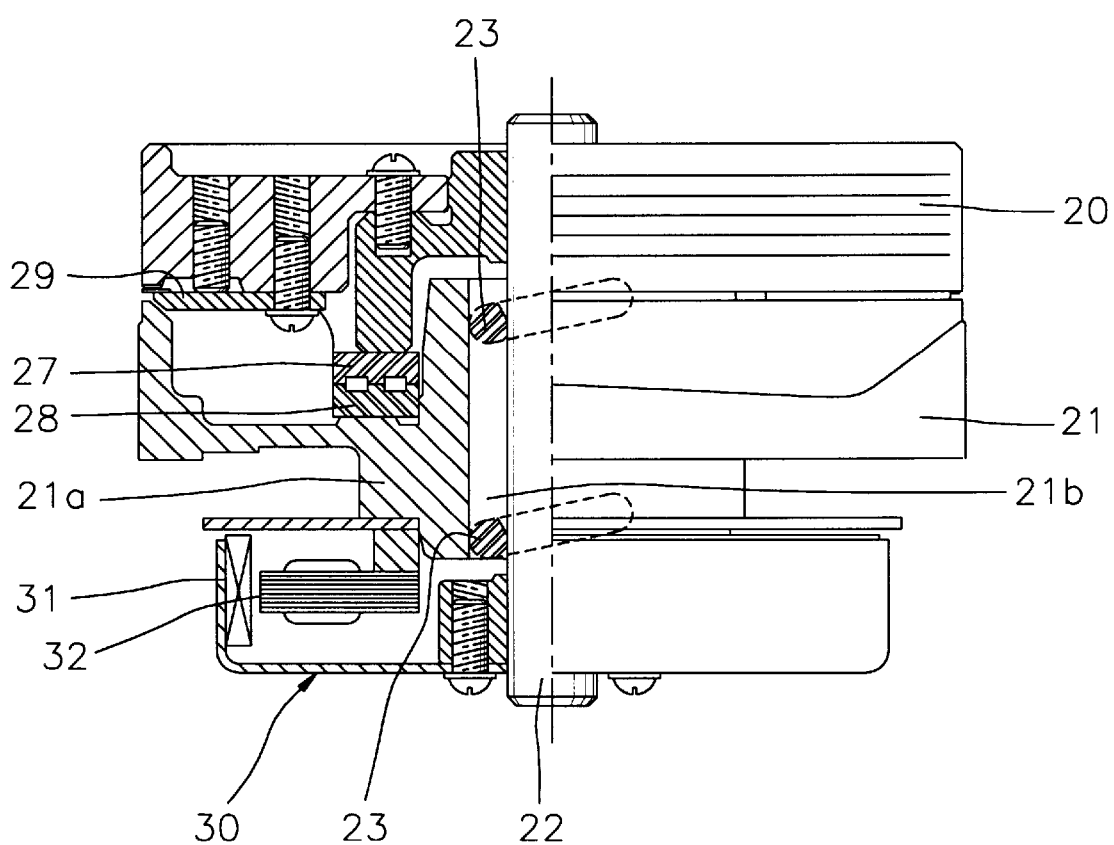
FIG. 2 illustrates a sectional view of an inventive head drum assembly employing a pair of oilless bearings.
Figure 3:
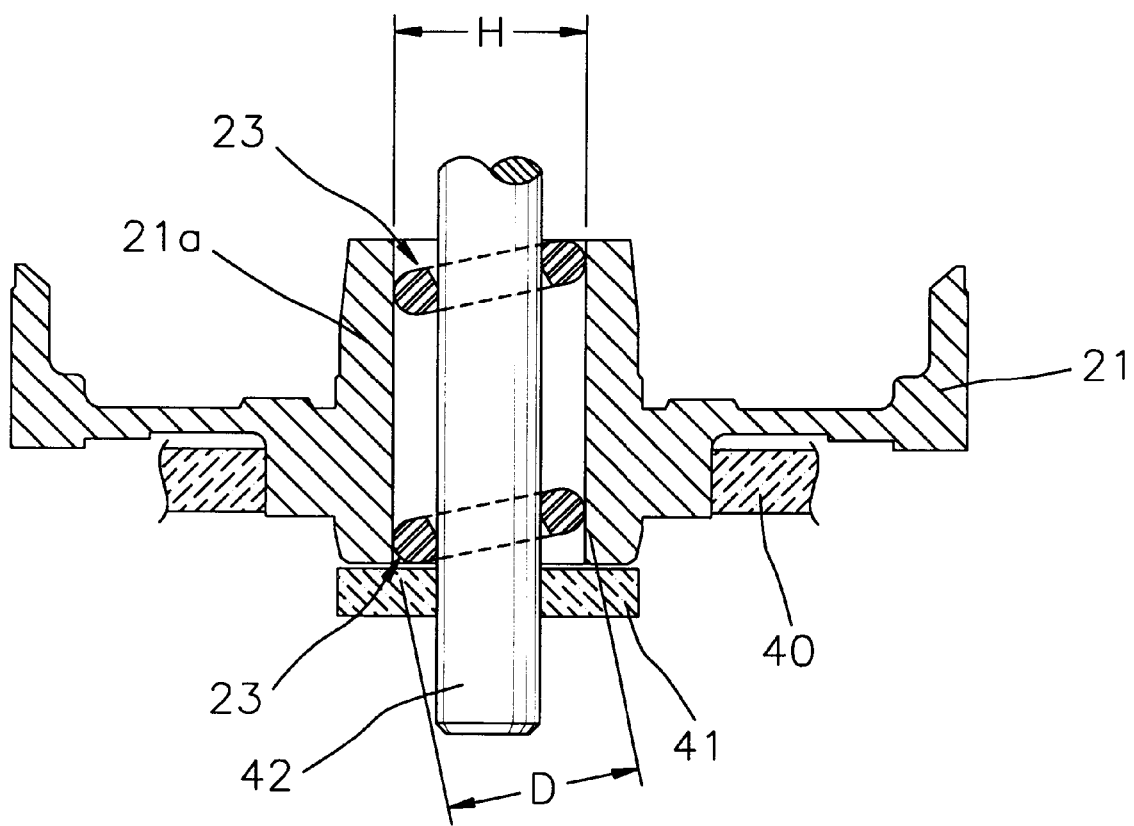
FIG. 3 depicts a schematic view of an assembling of the inventive head drum assembly.

As shown in FIGS. 2 and 3, the inventive head drum assembly includes a rotary drum 20 closely fitted around an upper portion of a supporting shaft 22 and a stationary drum 21 positioned around a lower portion of the supporting shaft 22. A boss 21a having a bore 21b is formed through the stationary drum 21. A pair of oilless bearings 23 by which the supporting shaft 22 is rotatably supported are mounted on an upper and a lower portions of the bore 21b, respectively.

Figure 4A:
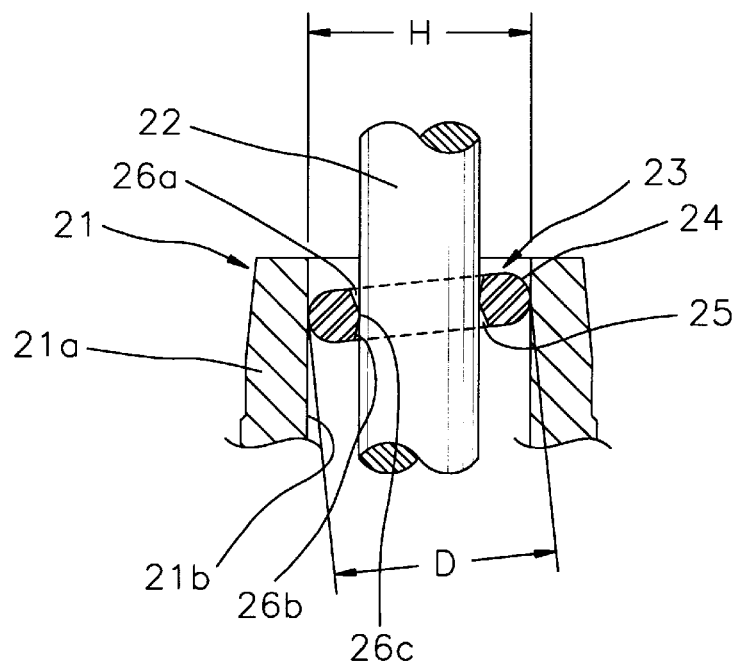
FIGS. 4a and 4b offer partial sectional views of assembling steps of the oilless bearing employed in the present invention, respectively.
Figure 4B:
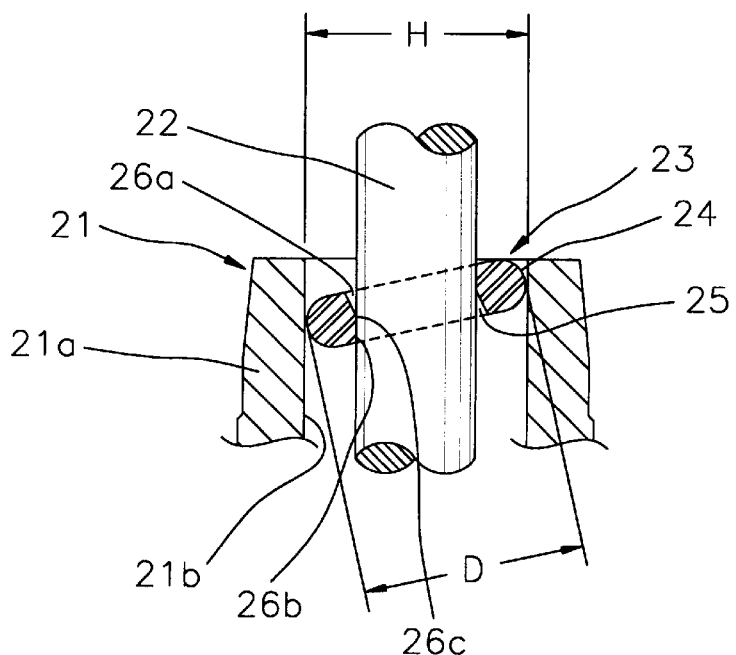
Figure 4C:
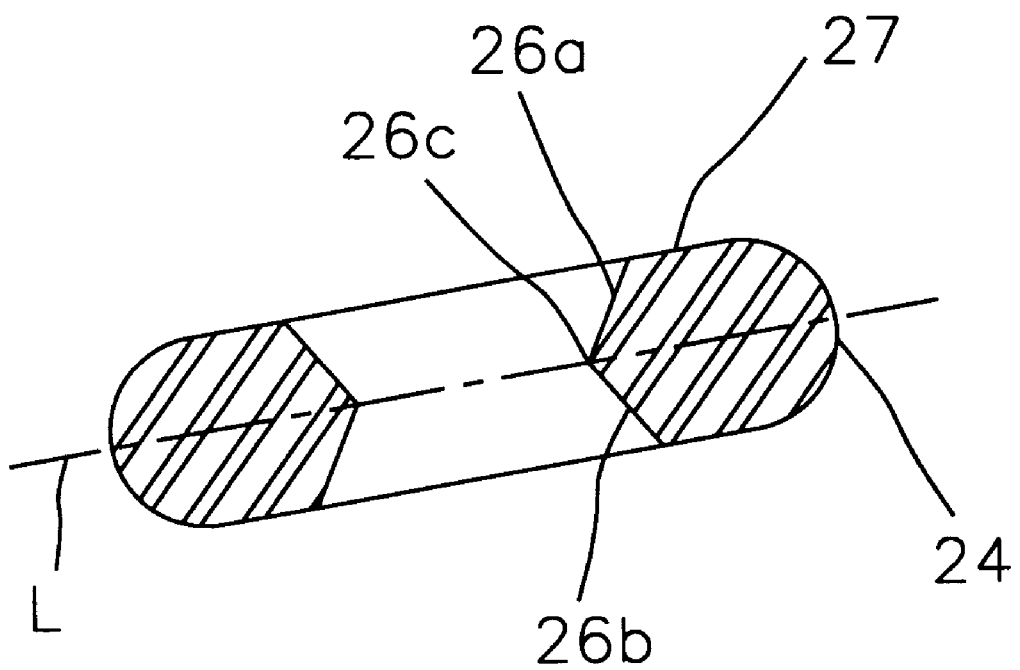
FIG. 4c presents a partial sectional view of the oilless bearing employed in the present invention.

As shown in FIG. 4c, the oilless bearing 23, as is a key member of the present invention, has a general donut-shaped configuration with its cross section including an external circular shape portion 24, an upper bearing surface 26a, a lower bearing surface 26b, an apex 26c and a pair of planar portions 27. The upper bearing surface 26a, the lower bearing surface 26b and the apex 26c define a bore 25 into which the supporting shaft 22 are received. The bearing surfaces 26a and 26b slantly extend from the pair of planar portions 27, respectively, meeting at the apex 26c in equal angles with respect to a center line L.

As shown in FIGS. 4a and 4b, the rounded feature of the external circular shape 24 of the cross section facilitates an insertion of the oilless bearing 23 into the bore 21b of the boss 21a, when the oilless bearing 23 is installed within the bore 21, sizing the bore 21b in a press-fit relationship therewith. A maximum external diameter D of the external circular shape 24 is greater than a diameter H of the bore 21b.

It is preferable that the inventive oilless bearing 23 be a type of a sintered oil retaining bearing, as well known in the art, in which lubricant retained within the bearing makes lubrications between the bearing surfaces 23a and 23b and the supporting shaft 12.

Detailed description of an installation of the oilless bearings 23 within the bore 21b is now made hereinbelow.

As shown in FIG. 3, the pair of oilless bearings 23 are first positioned within the bore 21b of the boss 21a, after the stationary drum 21 has been clamped by a clamp 40, being supported by a stopper 41. When a sizing guide shaft 42 driven by a press 43 positioned thereabove (not shown) is pushed into the oilless bearings 23, the oilless bearings 23 are changed in their orientations, sizing the bore 21b of the boss 21a in a press-fit relationship therewith, respectively, due to a contact between the apexes 26c and the sizing guide shaft 42. As a result, one of the bearing surfaces 23a and 23b of each of the oilless bearings 23 is selectively aligned with the sizing guide shaft 42. At this step, an accurate movement of the sizing guide shaft 42 is required to allow the oilless bearings 23 to be precisely aligned with each other and/or with other parts of the head drum assembly.

According to the present invention, only if the sizing guide shaft 42 moves accurately, the oilless bearings 23 can be easily and accurately installed within the bore 21b in a permitted tolerance between the bore 21b and the oilless bearings 23. That is, centers of axis of the selected bearing surfaces become a straight line, maintaining a precise co-axial relationship with the bore 21b of the stationary drum 21 in a way the selected bearing surfaces are contacted and aligned with sizing guide shaft 42, respectively.

Since during such installation of the oilless bearings 23 within the bore 21b, the movement of the oilless bearings 23 are sizing the bore 21b, the oilless bearings 23 become substantially unmovable with respect to the bore 21b after the sizing. Accordingly, each of the oilless bearings 23 installed within the bore 21b in this manner can continuously maintain its orientation, with one of the bearing surfaces 26a and 26b being accurately aligned with the supporting shaft 22 together with the bore 21b of the stationary drum 21. Once the oilless bearings 23 are fixed at their predetermined aligned orientation within the bore 21b, the sizing guide shaft 42 is removed from the oilless bearings 23. After completion of the installation, the oilless bearings 23 become ready for use with no subsequent machining being required; and the supporting shaft 22 is positioned thereinto.

According to the present invention, the oilless bearing 23 can be oriented within the assembly with a greater accuracy in only a conventional installation manner. Particularly, an exact co-axial relationship between the bore 21b and the oilless bearings 23, and an exact perpendicular condition of the supporting shaft 22 to a direction of rotation of the head drum assembly are readily obtained. Further, the inventive oilless bearing may allows a reduced manufacturing cost of the head drum assembly due to saving time in installing that within the head drum assembly. Furthermore, since the oilless bearing 23 does not need the bearing seat conventionally required, an effort to manufacture the stationary drum 21 may be reduced.

On the other hand, it should be understood that the oilless bearing 23 may be installed within a rotary drum if it is used in a head drum assembly having a fixed supporting shaft.

Although the invention has been shown and described with respect to the preferred embodiments, it will be understood by those skilled in the art that various changes and modifications may be made without departing from the scope of the invention as defined in the following claims.

What is claimed is:

1. A head drum assembly for use in a tape recorder of the type incorporating a rotary drum, a stationary drum and a rotating shaft, the assembly comprising:

a pair of oilless bearings installed within a bore of said stationary drum, each of said oilless bearings having a general donut-shaped configuration with its cross section provided with an external circular shape portion, an internal upper bearing surface, an internal lower bearing surface and a pair of planar portions, wherein said internal upper bearing surface and said internal lower bearing surface define an inner bore of the oilless bearing into which said rotating shaft are received, and said internal upper bearing surface and said internal lower bearing surface slantly extend from the pair of planar portions, respectively, meeting at an apex in equal angles with respect to a horizonal center line of said donut-shape.

2. The head drum assembly as recited in claim 1, wherein a maximum external diameter of said oilless bearing is greater than a diameter of said bore of the stationary drum.

3. The head drum assembly as recited in claim 1, wherein a vertical center axes of said oilless bearing is inclined with respect to a vertical center axes of said bore of the stationary drum.

* * * * *